J. S. SCHUGART.
WRENCH.
APPLICATION FILED JULY 19, 1911.
1,064,551.
Patented June 10, 1913.
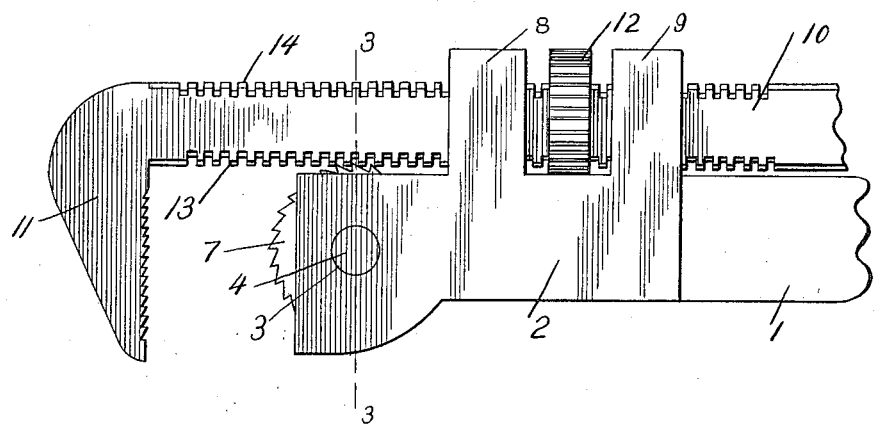
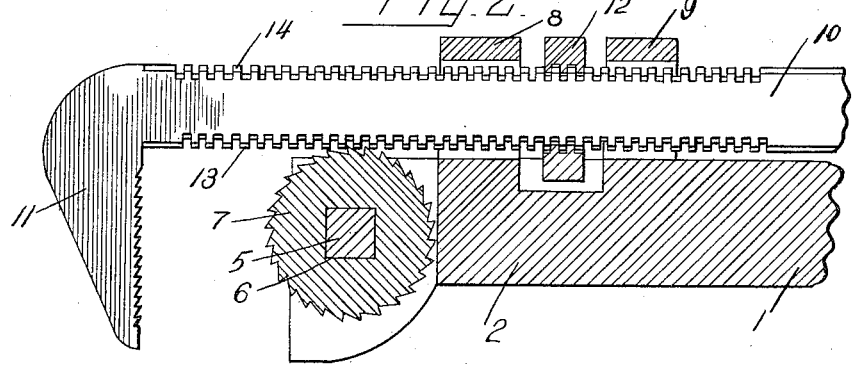
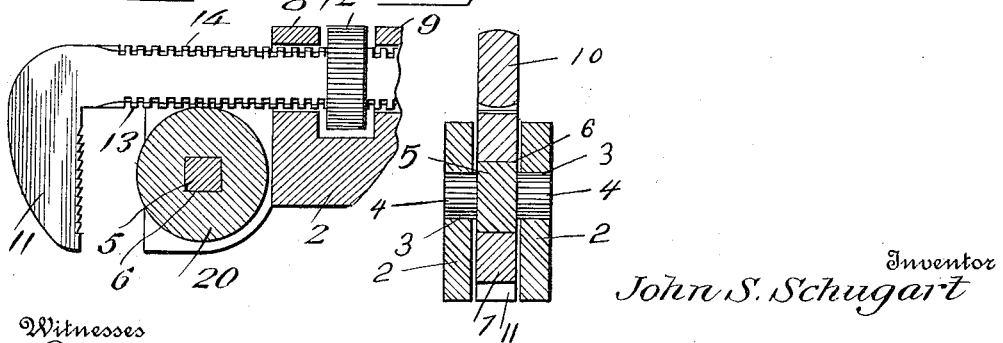
Inventor
John S. Schugart
Witnesses
By Victor J. Evans
Attorney

UNITED STATES PATENT OFFICE.

JOHN S. SCHUGART, OF WARREN, PENNSYLVANIA.

WRENCH.

1,064,551.  Specification of Letters Patent.  Patented June 10, 1913.

Application filed July 19, 1911. Serial No. 639,292.

*To all whom it may concern:*

Be it known that I, JOHN S. SCHUGART, a citizen of the United States, residing at Warren, in the county of Warren and State of Pennsylvania, have invented new and useful Improvements in Wrenches, of which the following is a specification.

This invention relates to wrenches.

The purpose of the invention is to provide a wrench which may be used as a pipe or nut wrench, which will have simple and effective means of adjustment, and which will have a corrugated or toothed roller bearing in one of its jaws, the said toothed roller coacting with teeth provided upon the shank of the movable jaw of the wrench so that the said movable jaw will automatically be brought toward the said roller when the wrench is employed upon a bolt or pipe.

The invention further consists in the novel construction and combination of the several parts as will be hereinafter fully set forth and pointed out in the claim.

Referring to the drawings,—Figure 1 is a side elevation of a wrench constructed in accordance with the present invention. Fig. 2 is a central longitudinal sectional view of a portion of the same. Fig. 3 is a transverse sectional view upon the line 3—3 of Fig. 1. Fig. 4 is a detail sectional view of a modification.

Referring to the drawings, in which like numerals of reference designate corresponding parts, the numeral 1 designates the shank of the wrench. This shank 1 may be provided with a suitable handle, if desired, and said shank, adjacent one of its ends, has its sides enlarged as designated by the numeral 2. The enlarged portion extends a suitable distance beyond the end of the shank proper, the said extending portion being provided with registering openings 3, the said openings adapted to receive the rounded ends or trunnions 4 provided upon a rectangular bolt 5. This bolt 5 is adapted to be received within an angular opening 6 provided upon a toothed wheel 7. The toothed wheel is of a circumference sufficient to project slightly beyond the ends of the extension of the shank as well as slightly above the upper faces of the said extension. The extension 2 is provided with spaced yoke members 8 and 9, the same projecting above the shank proper and the same being adapted to receive the threaded bar 10 provided upon the serrated jaw 11.

The numeral 12 designates a nut member which is adapted to have its teeth engage with the teeth 13 and 14 formed upon the upper and lower rounded faces of the bar 10. The nut has its outer periphery of a circular formation, and is preferably milled so that the said nut may be freely rotated upon the threaded bar 10. The lower threads 13 of the bar 10 are also adapted to coact with the teeth of the wheel 7, and the nut does not fully fill the space between the yokes 8 and 9, and when a pipe or the like is arranged between the jaw 11 and the toothed wheel 7, the said toothed wheel engaging the teeth 13 of the bar 12 is permitted a sufficient rotary movement to draw the jaw 11 toward the said toothed wheel.

This arrangement, it will be seen, is comparatively simple, but at the same time is thoroughly effective and it is believed that the advantages of the device will be perfectly apparent to those skilled in the art to which such inventions appertain without further detailed description.

In Fig. 4 I have illustrated a modified form of the device. In this figure the wheel 20 may have its periphery smooth or only slightly serrated. The wheel 20 is adapted to bear against the shank of the movable jaw and it will be noted that when the device to be operated upon is positioned between the jaw and the wheel 20, and the handle of the wrench is rotated in one direction, the said wheel will have a tendency to force the shank rearwardly or toward the said wheel 20 and consequently the article will be more tightly gripped between the jaw and the wheel.

Having thus fully described the said invention, what I claim is:—

In a wrench, a shank having one of its ends enlarged, and being provided with spaced yokes, the said shank having its outer end bifurcated, a wheel having its periphery provided with teeth which are inclined in one direction trunnioned within the bifurcated end of the shank, the said wheel extending both above and behind the shank, a jaw member having a longitudinally arranged bar which loosely passes through the yokes, the said bar having both its rear and front edges formed with threads, the threads upon the front edge of the bar adapted to co-act with the teeth of the wheel, a nut for the toothed bar, arranged between the yokes, and said nut being of a width sufficient to permit the wheel upon rotation to slide the bar longitudinally a distance sufficient to draw the jaw of the wrench toward the toothed wheel whereby both the jaw and the wheel will bite tightly upon the article gripped.

In testimony whereof I affix my signature in presence of two witnesses.

JOHN S. SCHUGART.

Witnesses:
EDWARD L. SCHUGART,
L. C. EDDY.